United States Patent [19]

Jones, Jr. et al.

[11] 4,429,328

[45] Jan. 31, 1984

[54] THREE-DIMENSIONAL DISPLAY METHODS USING VERTICALLY ALIGNED POINTS OF ORIGIN

[75] Inventors: Edwin R. Jones, Jr.; LeConte Cathey, both of Columbia; A. Porter McLaurin, Chapin, all of S.C.

[73] Assignee: CJM Associates, Chapin, S.C.

[21] Appl. No.: 283,902

[22] Filed: Jul. 16, 1981

[51] Int. Cl.³ .............................................. H04M 9/56
[52] U.S. Cl. ....................................... 358/88; 358/92; 353/7
[58] Field of Search ........................ 358/88, 89, 90, 91, 358/92; 352/57, 59, 60, 61; 353/7, 8, 9

[56] References Cited

U.S. PATENT DOCUMENTS

| | | |
|---|---|---|
| 904,212 | 11/1908 | Moran . |
| 986,163 | 3/1911 | Giordano . |
| 1,247,646 | 11/1917 | Craig . |
| 1,259,365 | 3/1918 | Cooper . |
| 1,267,689 | 5/1918 | Norton . |
| 1,371,438 | 3/1921 | Prucha . |
| 1,477,541 | 12/1923 | Clement et al. . |
| 2,050,826 | 8/1936 | Bloxsom . |
| 2,107,464 | 2/1938 | Zworykin . |
| 2,158,660 | 5/1939 | Kanolt . |
| 2,168,273 | 8/1939 | Sauer et al. . |
| 2,270,198 | 1/1942 | Schensted . |
| 2,273,512 | 2/1942 | Caldwell et al. . |
| 2,279,443 | 4/1942 | Chanosky . |
| 2,313,561 | 3/1943 | Mainardi et al. . |
| 2,403,733 | 7/1946 | Mainardi et al. . |
| 2,460,864 | 2/1949 | Whiteley . |
| 2,566,700 | 9/1951 | Goldsmith . |
| 2,693,128 | 11/1954 | Dewhurst . |
| 2,933,008 | 4/1960 | Barnett ................... 88/14 |
| 2,983,835 | 5/1961 | Frey, Jr. .................. 313/89 |
| 3,019,698 | 2/1962 | Sheldon . |
| 3,020,341 | 2/1962 | Owens . |
| 3,089,917 | 5/1963 | Fernicola ................. 178/6.5 |
| 3,165,578 | 1/1965 | Lauricella ................ 178/5.4 |
| 3,418,044 | 12/1968 | Sheldon . |
| 3,457,364 | 7/1969 | Carrillo .................. 178/6.5 |
| 3,595,995 | 7/1971 | Hobrough . |
| 3,608,457 | 9/1971 | Barker . |
| 3,626,404 | 12/1971 | Ophir . |
| 3,705,261 | 12/1972 | Langley . |

FOREIGN PATENT DOCUMENTS

7831 of 1914 United Kingdom .

OTHER PUBLICATIONS

File History, U.S. Patent Appln. Ser. No. 308,209, issued to *Imsand*, filed Jan. 20, 1972.
M. Schubin, "Solid Television: 3-D For the One Eyed?", Videography, Jun. 1980, pp. 59-62.
J. L. Linback, "Other Third-Dimensional Systems," Four Aspects of Film, Chapters 1-4, pp.139-182, 1968.
T. Okoshi I, "Three-Dimensional Displays," Proceedings of the IEEE. vol. 68, No. 5, pp. 548-564, May 1980.
T. Okoshi II, "Three-Dimensional Imaging Techniques," pp. 56-59, and 394-395, Academic Press, 1976.
I. Hadani et al., "Visual Stability and Space Perception in Monocular Visions: Mathematical Model," J. Opt. Soc. Am., vol. 70, pp. 60 & 65, Jan. 1980.
B. Julesz I, Foundations of Cyclopean Perception, pp. 2, 3, 16, 19, 20, 21, 143-149, 183, 184, 185, 222, 223, 253, 254, University of Chicago Press, 1971.
B. Julesz II, "Cooperative Phenomena in Binocular Depth Perception," American Scientist, vol. 62, pp. 32-43, Jan.-Feb. 1974.
"The Focal Encyclopedia of Film and Television Techniques," pp. 594, 673, 753, and 775-782, Hastings House, 1969.
"Effect of Vertical Disparity upon Stereoscopic Depth," Vision, Res. vol. 18, pp. 351-352, 1978.
Pavlista, Sharon, "3-D Camera Odyssey in the Home Stretch," Venture, Oct. 1980, pp. 78 and 80.

*Primary Examiner*—Robert L. Griffin
*Assistant Examiner*—Edward L. Coles
*Attorney, Agent, or Firm*—Finnegan, Henderson, Farabow, Garrett and Dunner

[57] ABSTRACT

Development of a three-dimensional illusion through sequential displaying on a viewing surface of images of the subject as viewed alternatively first from one point of origin and then, time displaced, from another point of origin at a rate within a range of 4 to 30 changes between the points of origin per second. The effect of the illusion is maximized by having the points of origin vertically aligned with respect to one another and having the points of origin displaced from one another a distance less than normal interoccular distance.

20 Claims, 17 Drawing Figures

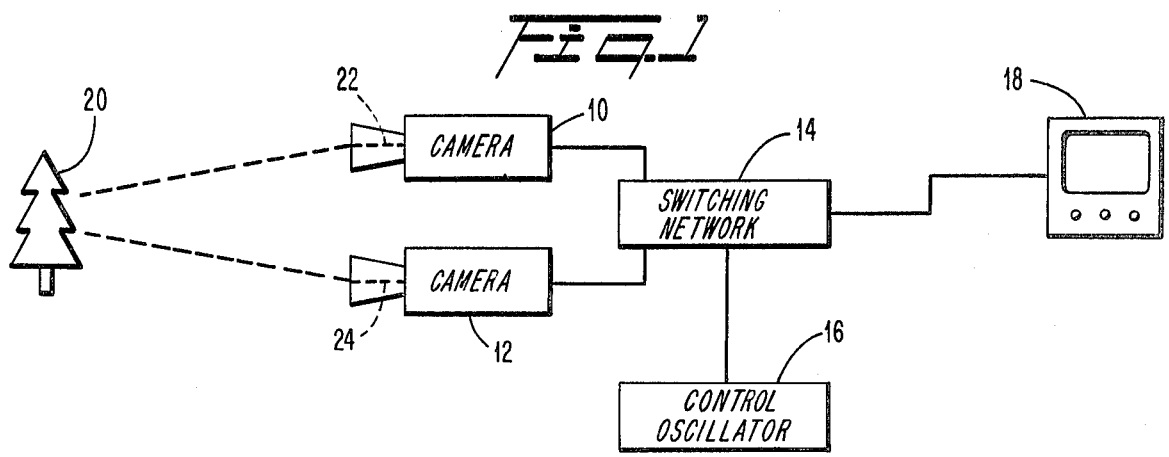
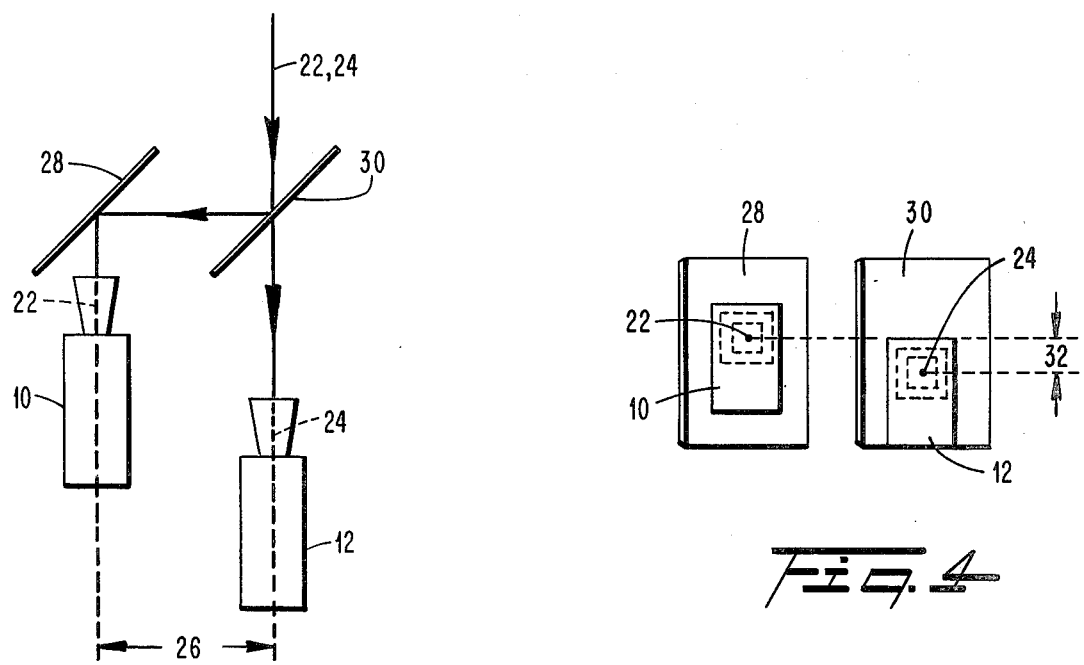
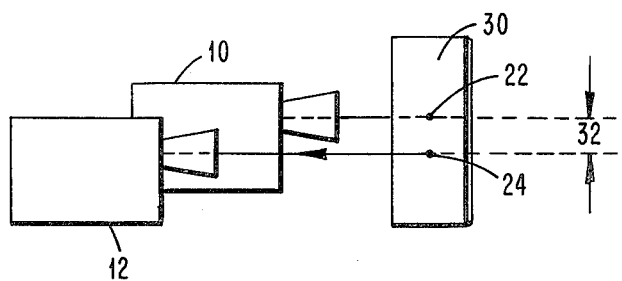

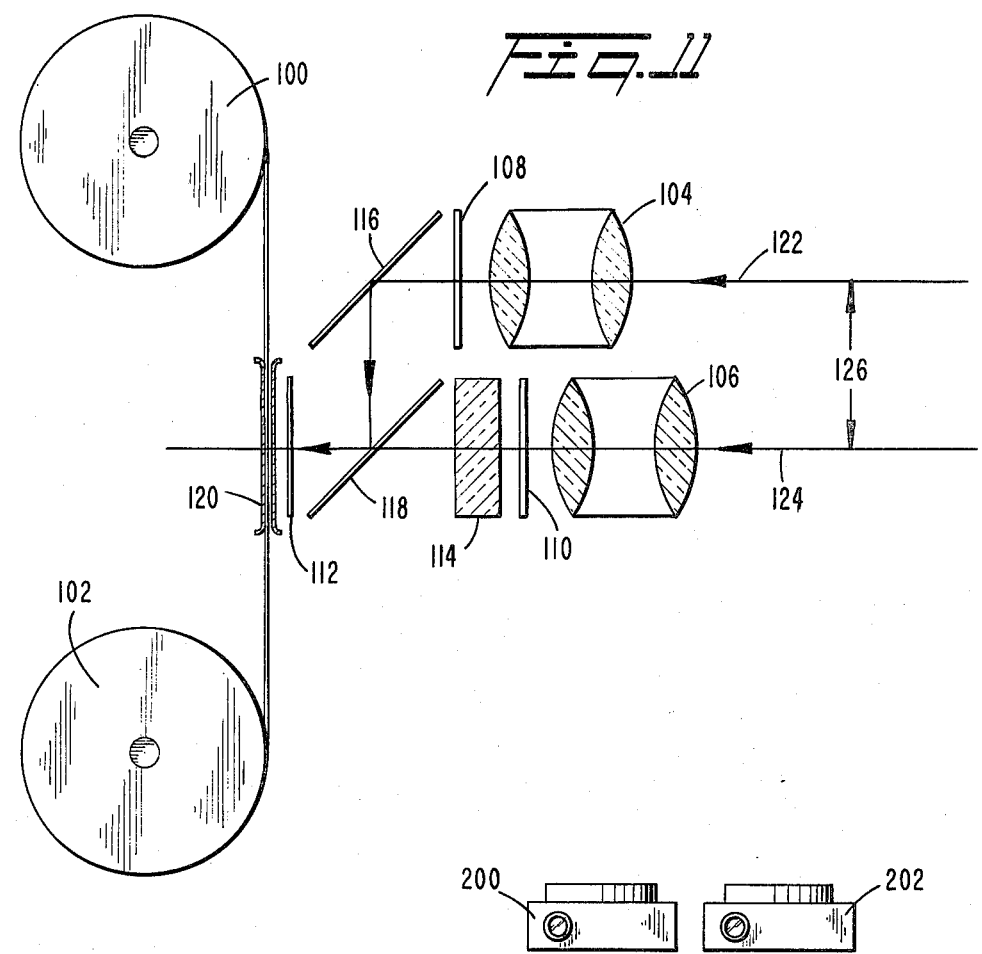
Fig. 11
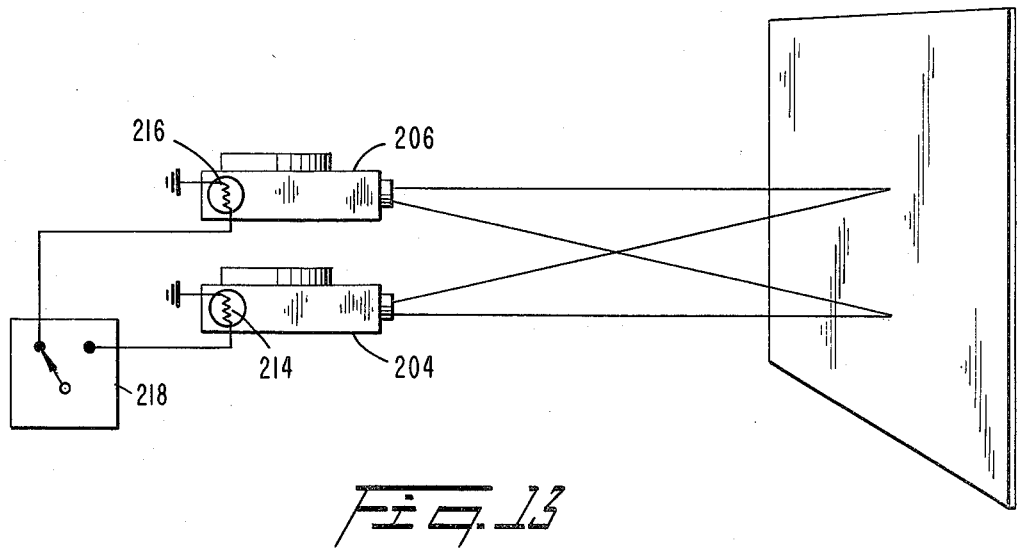
Fig. 12
Fig. 13

THREE-DIMENSIONAL DISPLAY METHODS USING VERTICALLY ALIGNED POINTS OF ORIGIN

BACKGROUND OF THE INVENTION

1. Field of the Invention

The present invention relates to apparatus and methods pertaining to three-dimensional display systems.

2. Description of the Prior Art

Stereoscopic films are known. Such films may comprise a double row of left and right images, or a single row of alternate left and right images which have been photographed from horizontally aligned left and right points of origin. Prior art three-dimensional systems typically operate upon the principle that left and right eye images must remain separated in order to create a steroscopic effect. These "binocular" systems therefore employ red and green colored glasses, mechanical viewers, or polarized filters in order to assure that only the left eye images reach the left eye and the right eye images reach the right eye. Although results from such systems can be spectacular, the need for extraneous viewing equipment has led to the commercial demise of all such systems. Furthermore, none of these system is capable of displaying a three-dimensional illusion using simply a standard 24 frame per second movie projector or using a standard home television receiver.

The history of prior art three-dimensional systems occasionally includes mention of a "monocular" or "cyclopean" system, in which alternately left and right images were rapidly displayed in an effort to create a three-dimensional illusion through "fusion" of the the two images. Complicated multi-film projectors were utilized to implement such systems, left and right images were taken simultaneously on a single film strip to facilitate registration, and speeds of 48 frames per second were tried, but none of these systems achieved any significant commercial success and none was deemed capable of displaying a three-dimensional illusion using simply a standard 24 frame per second movie projector or using a standard home television camera. Moreover, even at a reduced rate of display wherein the steroscopic effect is increased, the inventors have determined that the appearance of jumping between successive images renders an unsatisfactory result.

Each of the prior art systems known to the inventors is believed to have failed primarily because the system was complicated. To succeed, a three-dimensional system must be simple. The system must be capable of use with a standard 24 frame per second projector and/or must be capable of use for a standard home television receiver—without any modification.

Accordingly, an object of the subject invention is to provide a display system which exhibits a three-dimensional illusion using a standard, unmodified 24 frame per second movie projector as a means for display.

Another object of the subject invention is to provide a display system which exhibits a three-dimensional illusion using a standard, unmodified home television receiver as a means for display.

Another object of the present invention is to provide a display system which exhibits a three-dimensional illusion in which a representation of the images to be displayed is recorded on a standard single strip of photographic film.

A still further object of the subject invention is to provide a display system which exhibits a three-dimensional illusion in which a representation of the images to be displayed is recorded on a standard video tape.

Another object of the present invention is to provide a display system which exhibits a three-dimensional illusion in which the images to be displayed are either created and/or stored in the memory bank of a computer of the type employed in video games which are today becoming commercially popular.

Additional objects and advantages of the invention will be set forth in part in the description which follows and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a method for producing a three-dimensional illusion of a subject is provided which comprises the step of sequentially displaying on a viewing surface images of the subject as viewed alternatively first from one point of origin and then, time displaced, from another point of origin at a rate within a range of 4 to 30 changes between points of origin per second, with the points of origin being vertically displaced from one another. Preferably the above-mentioned range is between 6 and 15 changes per second, and most perferably about 8 changes per second.

The images may be recorded on a single film strip for display at the rate of 24 images per second. In such a case, to achieve the preferred 8 changes per second, 3 images from the first point of origin are followed by 3 images from the second point of origin, and so on. A rate as high as 24 changes per second can be achieved by alternately placing images from the first and second points of origin, and rates as slow as 4 changes per second may be achieved by placing 6 images from one point of origin followed by 6 images from the other point of origin, and displaying the film at the standard film speed of 24 frames per second in a standard, unmodified projector.

Most preferably, the points of origin are vertically aligned with respect to one another and the points of origin are displaced from another a distance less than the standard 65 mm interocular distance of human eyes. The points of origin are perferably displaced from one another at a distance on the order of 10 to 15 mm.

The combination of changing points of origin between 4 and 30 times per second, preferably between 6 and 15 times per second, and most preferably about 8 times per second, vertically aligning the points of origin, and separating the points of origin by less then normal inter-ocular spacing provides an effective three-dimensional method capable of being used either with a standard 24 frame per second movie projector or a standard home television viewer without modification.

A still further aspect of the invention contemplates a method using two slide projectors for producing three-dimensional illusions from slides. This method comprises the steps of: obtaining first and second slides of the subject, the first slide representing a view of the subject from one point of origin and the second slide representing a view of the subject from another point of origin, the points of origin being vertically displaced from one another; and alternately displaying the slides at a rate within a range of 4 to 30 changes per second between the first and second slides. Perferably the rate of change is between 6 and 15 changes per second, and most perferably about 8 changes per second. It is also perferable that the first slide be displayed from a first projector and the second slide be displayed from a second projector, with the step of displaying being achieved by alternately activating light sources of the first and second projectors.

BRIEF DESCRIPTION OF THE DRAWINGS

The accompanying drawings, which are incorporated in and constitute a part of the specification, illustrate a preferred embodiment of the invention and, together with the general description of the invention given above and the detailed description of the preferred embodiments given below, serve to explain the principles of the invention.

FIG. 1 is a block diagram of a system incorporating the features of the subject invention;

FIG. 2 illustrates the position of two video cameras in accordance with a preferred embodiment of the invention;

FIG. 3 illustrates a side view of the camera position shown in FIG. 2;

FIG. 4 illustrates a front view of the camera position illustrated in FIG. 2;

FIG. 11 illustrates a lens arrangement for achieving on photographic film the image orientations shown in FIGS. 10A-10E;

FIG. 12 illustrates the utilization of two projectors to achieve a three-dimensional illusion in accordance with the teachings in the present invention; and FIG. 13 illustrates an alternative projector positioning to that shown in FIG. 12.

DETAILED DESCRIPTION

Figure 5:
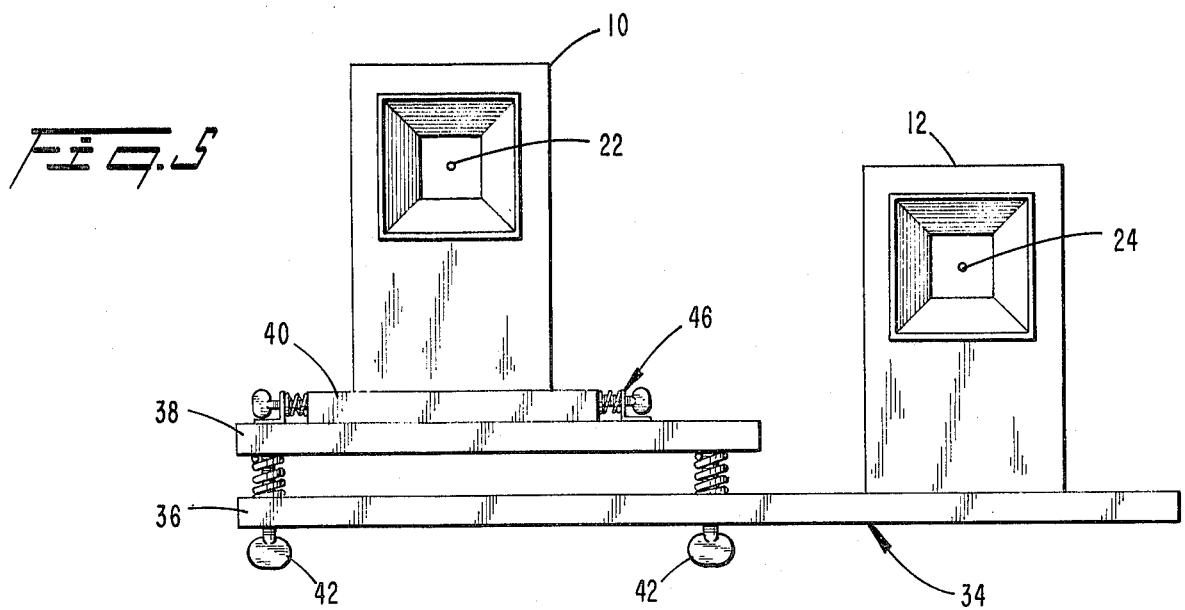
FIG. 5 illustrates a particular mechanism for achieving the camera position illustrated in FIGS. 2-4.

The subject invention comprises methods and apparatus for presenting images which are perceived by the viewer to be three-dimensional when viewed with the unaided eye. The viewing mechanisms can include slides, photographic film, and/or television. Television can be used to transmit the images produced by the slides or film, or to originate directly three-dimensional images. In addition, the images may be generated by a computer and/or stored in a computer memory and generated by television techniques on a video screen used in connection with display devices such as video games.

In accordance with the present invention, images of a subject as viewed alternatively first from one point of origin and then, time displaced, from another point of origin at a rate within a range of 4 to 30 changes between points of origin per second are displayed on a viewing mechanism. For example, in FIG. 1 there is illustrated a first video camera 10, a second video camera 12, a switching network 14, a control oscillator 16, and a television monitor 18. The output of cameras 10 and 12 is selectively coupled by switching network 14 to monitor 18, with monitor 18 displaying the image viewed by that camera 10 or 12 which is, at the moment under consideration, connected by switching network 14 to the input of monitor 18. The frequency of operation of switching network 14 is governed by the output of control oscillator 16.

As shown in FIG. 1, cameras 10 and 12 are both directed at a subject 20. Camera 10 views subject 20 from a point of origin 22 which, for purposes of this invention, is generally and broadly defined as the optical axis of the input lens of camera 10. Camera 12 views subject 20 from another, different, point of origin 24 defined by the optical axis of the input lens of camera 12. By alternately connecting the outputs of cameras 10 and 12 to the input of monitor 18, through the operation of switching network 14, monitor 18 displays images of subject 20 as viewed alternately first from one point of origin 22 and then, time displaced, from another, different, point of origin 24.

The rate of changes appearing at monitor 18 between point of origin 22 and point of origin 24 is governed by operation of control oscillator 16. In accordance with the subject invention, this rate of change is within a range of 4 to 30 changes between points of origin per second. Preferably, this rate of change is between 6 and 15 changes per second, and most preferably this rate of change is about 8 changes per second. For example, when operating at a rate of 8 changes per second, every 0.125 seconds switching network 14 operates to switch monitor 18 from one to the other of cameras 10 and 12. Thus, an output control signal from control oscillator 16 having a frequency of 8 cycles per second may ideally be employed to govern operation of switching network 14. As the rate of change between points of origin approaches 30, a three-dimensional illusion presented on the viewing surface of monitor 18, namely the surface of the cathode ray tube of monitor 18, diminishes. Above a rate of approximately 30 changes between points of origin per second, the two images become fused into one, and the three-dimensional affect is effectively lost. Below 4 changes per second, the two separate images from each point of origin are seen as simply two separate images. The preferred rate of operation is around 8 changes per second, and good results occur between 6 and 15 changes per second.

Although a steroscopic effect is achieved by simply operating the system of FIG. 1 at a rate within a range of 4 to 30 changes between points of origin per second, the operation of FIG. 1 is substantially enhanced by vertically displacing the points of origin of cameras 10 and 12 with respect to one another. Preferably the vertical displacement takes the form of a vertical alignment of one point of origin directly over the other, without any horizontal displacement therebetween. Futhermore, although steroscopic effect is increased by maximizing the distance between the points of origin of cameras 10 and 12, more precise registration of the images produced by cameras 10 and 12 is achieved by displacing the points of origin of cameras 10 and 12 from one another at a distance less than the normal interocular distance of a human being, namely less than approximately 65 millimeters. Most preferably the distance between the points of origin is chosen to be within the range of 10 to 15 millimeters.

The vertical displacement of the points of origin can be achieved in accordance with the arrangement illustrated in FIGS. 2, 3, and 4 wherein cameras 10 and 12 are shown arranged side-by-side with optical axis 22 and 24 of cameras 10 and 12, respectively, substantially parallel to one another and separated a distance 26 which is less than 65 millimeters, and preferably on the order of 10 to 15 millimeters. Camera 10 is aligned to receive optical images reflected from a one hundred percent reflecting mirror 28, while camera 12 is aligned to receive video images through a two-way mirror 30. The surfaces of mirrors 28 and 30 are positioned parallel to one another and at a 45 degree angle to the optical axes 22 and 24 of cameras 10 and 12. However, as is best shown in FIGS. 3 and 4, optical axis 22 is located at a distance 32 above optical axis 24. Accordingly, the optical axes of cameras 10 and 12 effectively lie in the same vertical plane, but lie in horizontal planes vertically separated from one another a distance 32. Preferably this separation distance is less than 65 millimeters and most preferably is within the range of 10 to 15 millimeters.

Although the human eyes, which represent the points of origin of images viewed by a human being, are horizontally aligned with respect to one another, the vertical alignment of the points of origin as illustratively shown in FIGS. 2 through 4, results in a three-dimensional image in which undesirable motional effect of the resulting display is decreased over the motional effect achieved with horizontal orientation of the points of origin. For reasons not yet fully understood, motion due to vertical parallax which is observed in a vertical point of origin orientation system is less disturbing than motion due to horizontal parallax observed in a horizontal point of origin orientation system.

Figure 6:
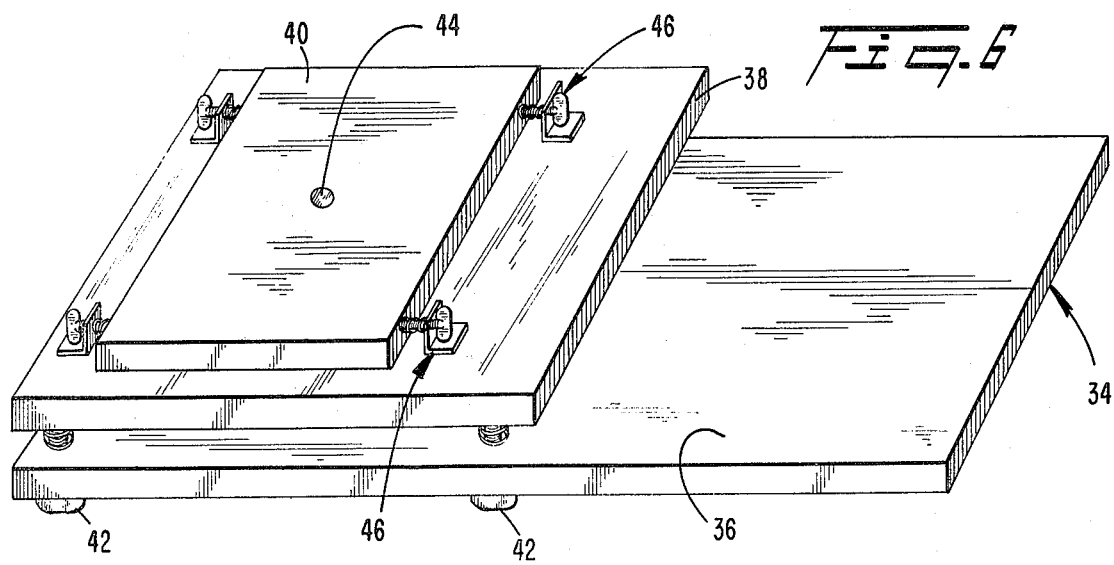
FIG. 6 is a perspective view of the platform illustrated in FIG. 5.

One simple example of an apparatus for satisfactorily mounting cameras 10 and 12 in a vertical point of origin orientation is shown in FIGS. 5 and 6 as utilizing a tripod head 34. Tripod head 34 includes first plate 36, second plate 38, and third plate 40. Camera 12 is anchored directly to first plate 36. Second plate 38 is spring loaded onto first plate 36 and held in position by thumb screws 42. Plate 38 can be moved vertically with respect to plate 36 by operation of thumb screws 42. Plate 38 can also be tilted about an axis along the optical axis of camera 10 and/or about a horizontal axis perpendicular to optical axis 26 of camera 10.

Figure 7:
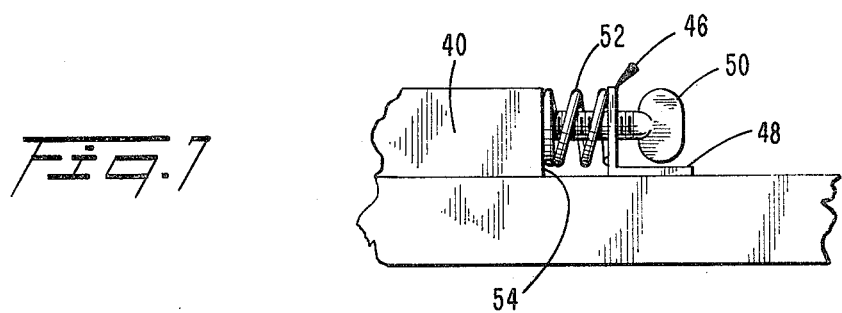
FIG. 7 illustrates a bracket shown in FIGS. 5 and 6.

Third plate 40 is mounted by center located swivel pin 44 to second plate 38 and moves against the operation of spring loaded thumb screws 46. As is more clearly shown in FIG. 7, thumb screws 46 each include a right angle bracket 48, a screw 50 and a spring 52. One leg of each bracket 48 is attached to second plate 38, and the second leg of each bracket 48 includes an opening to receive screw 50. Spring 52 is located between the second leg of each bracket 48 and a side wall 54 of third plate 40. Accordingly, the adjustment of screws 50 in brackets 46 provide for controlled motion of plate 40 about a veritical axis concentric with the axis of swivel pin 44.

Figure 8:
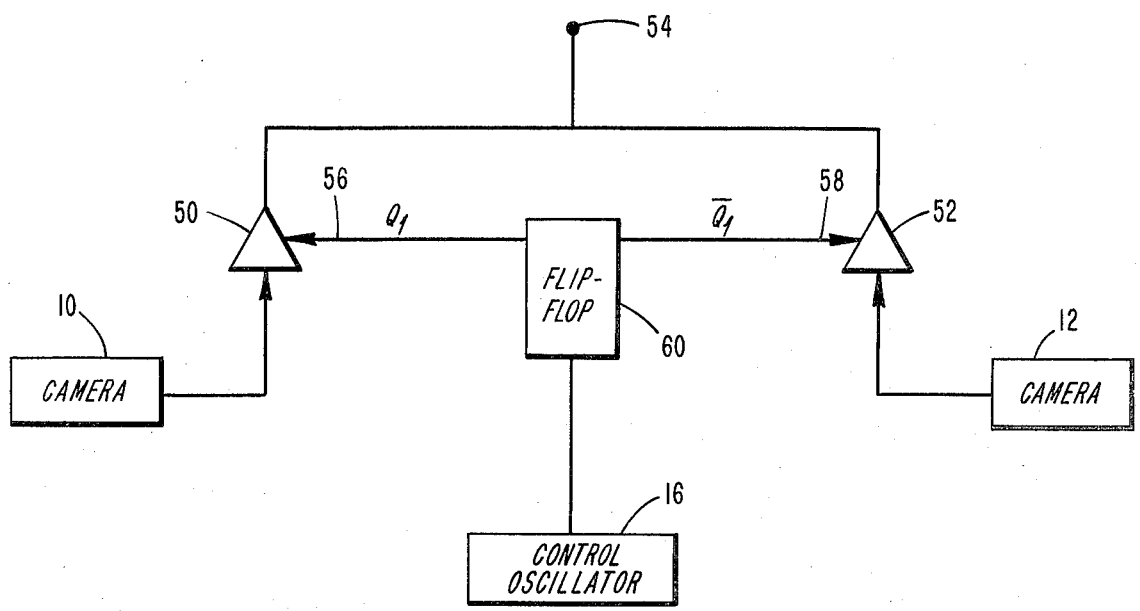
FIG. 8 is a block diagram of a dual video camera system incorporating the features of the subject invention.

The schematic block diagram of FIG. 8 shows one illustrative example of an electronic circuit suitable for use in connection with the subject invention. In FIG. 8 the video output of cameras 10 and 12 is coupled to the input of amplifiers 50 and 52, respectively. The output of amplifiers 50 and 52 is coupled to a common output terminal 54. Amplifiers 50 and 52 each have enable terminals 56 and 58, respectively. The $Q_1$ output of a flip-flop 60 is coupled to enable terminal 56 of amplifier 50 whereas the inverse output $\overline{Q_1}$ of flip-flop 60 is coupled to enable terminal 58 of amplifier 52. As set forth above, the vertical alignment of the video input for cameras 10 and 12 is achieved, for example, by using the apparatus illustrated in FIGS. 2-7, or apparatus optically similar thereto, to provide to camera 10 the image of the subject 20 (FIG. 1) as viewed from one point of origin and for providing to the camera 12 the image of subject 20 as viewed from another point of origin.

Amplifiers 50 and 52, flip-flop 60, and control oscillator 16, provide means for alternately coupling the output signal from each of the video cameras 10 and 12 one at a time to output terminal 54 at a rate within a range between 4 and 30 times per second. Output terminal 54 may, for example, be coupled to the input of monitor 18 (FIG. 1) so that monitor 18 provides a display mechanism for converting the output signals from cameras 10 and 12 at terminal 54 into a visual display.

Although optical elements such as mirrors are illustrated as being utilized in the arrangement shown in FIGS. 2-4, it is to be understood that a lens system, a prism system, or any equivalent optical arrangement is to be deemed equivalent to the specific mirror system illustrated. Moreover, if the cameras employed are small enough, it is possible that the lenses may be set at the appropriate optical interrelationship with respect to one another, without any intervening apparatus other than the lenses of the cameras themselves. The lenses of the cameras themselves are, in such instances, the means for providing the first camera with the image of the subject as viewed from one point of origin and the second camera with the image of the subject as viewed from another point of origin.

Each camera 10 and 12 is supplied a synchronizing signal. Usually these signals are identical, but special effects can be generated if these signals are adjusted for different times relative to each other. When using equal and normal synchronization pulses of 60 hertz to give a 30 hertz total framing rate, since the interlacing of two half frames is required to give a full frame, using every other synchronizing pulse to operate flip-flop 60 would result in whole pictures from cameras 10 and 12 being interlaced alternatively at output terminal 54. The number of synchronizing pulses transmitted between each input pulse to flip-flop 60 thereby determines the rate of change of points of origin available at output terminal 54.

The number of synchronizing pulses transmitted between each input pulse to flip-flop 60 need not be the same. This can result in the number of full frames from each camera not being equal. This can also generate special effects. However, typically, an equal number of frames from each of cameras 10 and 12 is chosen to be delivered to output terminal 54 between input pulses to flip-flop 60. The pattern followed preferably is N full frames from camera 10 then N full frames from camera 12. The mixed output is thus a series of video signals for pictures alternately from camera 10 and camera 12. These signals are then transmitted just like any ordinary single camera video signal.

The camera fields of view are adjusted so as to place the images in registry at some plane in the field of view of the cameras. This necessitates adjustment of the cameras so that the parallax seen on a viewing television screen is zero at some distance from the cameras. Adjustment of the cameras can easily be made while viewing the resultant images on the television. The correct adjustment is sensed when there is no motion of objects between images recorded by camera 10 and camera 12 at the desired distance. The mind of the viewer will then sense a depth to the composite camera 10 and 12 views.

The preferred adjustment of the circuit of FIG. 8 is to select two full frames of each camera 10 and 12 prior to switching of flip-flop 60. The resulting frame switching is thus 15 hertz between cameras 10 and 12. Viewing the composite picture for single frames at a rate of 30 hertz is the extreme upper limit, and in fact under some circumstances appears too fast for best impression of depth. The viewing of three frames of pictures from each camera at a rate of change of 10 hertz has been observed as being as satisfactory as the utilization of two frames from each camera 10 and 12 prior to change-over. Increasing the number of frames to four prior to a change results in a 7.5 hertz rate which also has been observed to provide comfortable three-dimensional viewing.

A scan rate of sub-multiples of 60 hertz is dictated by the standardization of commercial television under 60 hertz line frequency in the United States. If a closed circuit system is used independently of the commercial television system, such as in a computerized video game, then any frequency in the range from about 4 to 30 hertz, and most preferably in the range of 6 to 15 hertz for the operation of flip-flop 60 will be satisfactory.

Figure 9:
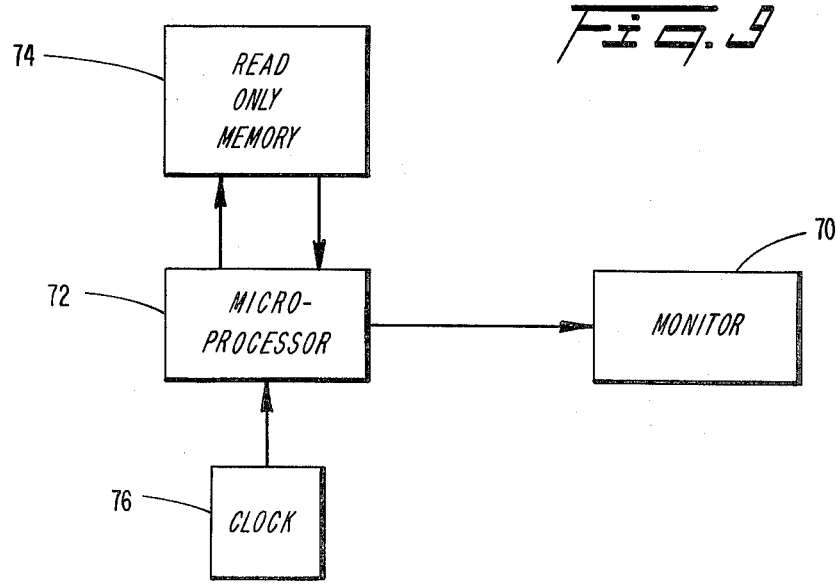
FIG. 9 is a block diagram of a computer incorporating the features of the subject invention.

Furthermore, it is to be understood that the principles of the present invention may be achieved in connection with a television display mechanism, without the use of video cameras. For example, visual computer games which are well-known today include a cathode ray tube monitor 70 as shown in FIG. 9, the display on which is governed by operation of a microprocessor 72. Microprocessor 72, as is well-known to those skilled in the art, retrieves stored display data from a memory such as ROM 74, and causes an image represented by the stored data to appear on the display screen of monitor 70. The operation of microprocessor 72 is controlled by a clocking mechanism 76.

In present day video games, the resultant images portray a flat two dimensional illusion. However, if data representing images of a subject as viewed alternately from first one point of origin and then, time displaced, from another point of origin were stored in ROM 74 and displayed by microprocessor 72 on monitor 70 at a rate within a range of 4 to 30 individual viewings per second, a standard video game could be made to present a three-dimensional illusion. As is true when employing the subject invention in connection with standard television cameras, it is preferable that the points of origin of the data stored in ROM 74 be vertically displaced with respect to one another and that the data represent the subject as viewed from points of origin displaced from one another at a distance less than 65 mm, and preferably in the range of 10-15 mm. Furthermore, it is preferable that the range of operation be between 6 and 15 changes in points of origin per second, and most preferably about 8.

The teachings of the present invention may also be employed to result in the illusion of a three-dimensional picture by placing on a single film strip images of a subject as viewed alternately first from one point of origin and then, time displaced, from another point of origin at a rate within 4 to 30 changes between points of origin per second. For example, as shown in FIG. 10*a*, time consecutive images of a subject viewed from point of origin A at times t1 through t12 are represented by images A1 through A12, respectively. In FIG. 10*b* there are shown on a single film strip images of the same subject viewed from another point of origin B represented as images B1 through B12 for times t1 through t12, respectively. Using a standard timed film of 24 images per second, each time period t1 represents 1/24th of a second. To achieve a resultant display within the requisite range of 4 to 30 changes per second, the images A1 through A12 and B1 through B12 may be arranged on a single film strip as shown in FIG. 10*c* wherein four consecutive images from point of origin A are followed by four consequence images from point of origin B, resulting in a change of point of origin at a rate of 6 times per second. By reducing the number of images from a particular point of origin before changeover to three, as shown in FIG. 10*d*, a single film strip is provided which changes views at a rate of 8 changes per second. Moreover in FIG. 10*e*, only two consecutive images from a single point of origin are shown before changeover, resulting in a film strip, when projected at a standard rate of 24 images per second, having a 12 point of origin change per second rate.

Figure 10E:
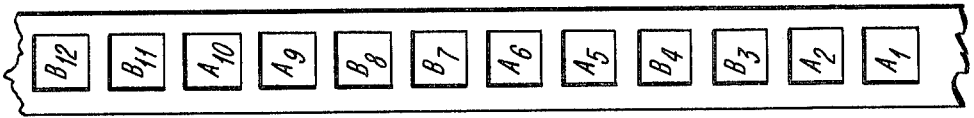
FIG. 10A-10E diagramatically illustrate images arranged on photographic film in accordance with the teachings of the present invention.
Figure 10D:
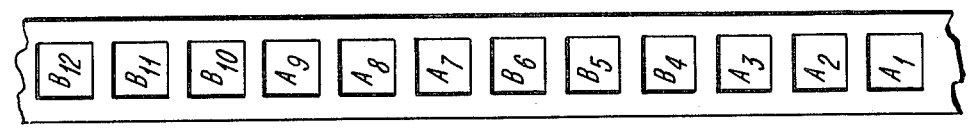
Figure 10C:
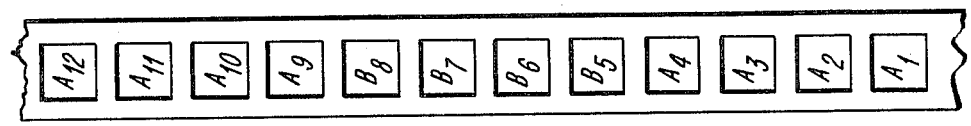
Figure 10B:
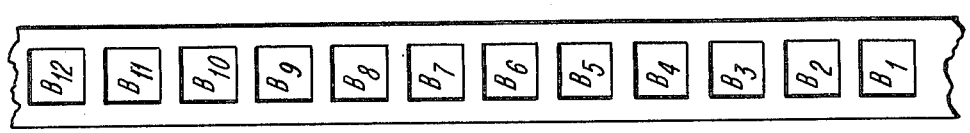
Figure 10A:
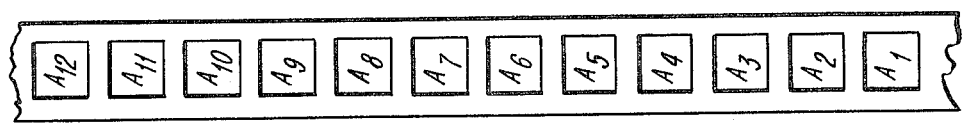

It should be noted that each of the images disclosed in the single film strips shown in FIGS. 10*c* through 10*e* are "time displaced" from one another, in contradistinction to having images from two points of origin both taken at a single point in time. The time displacing of images results in a smoother transition during change in points of origin, without sacrificing stereoscopic effect.

Film strips as shown in FIGS. 10*c* through 10*e* may be projected from a standard 24 frame per second projector without any modification to the projection, and without the need of any viewing aids such as colored glasses, polarized glasses or mechanized viewers to achieve a three-dimensional illusion. By using a single projector, the lens of the projector forms a single point of origin, thereby maximizing registration of the projected images.

FIG. 11 provides a simple illustration of a motion picture camera which enables production of the film strip shown in FIGS. 10*c* through 10*e*. The camera of FIG. 11 includes a supply spool 100, a takeup spool 102, camera lenses 104 and 106, shutters 108, 110, and 112, a glass plate 114, a standard mirror 116, a two way mirror 118, and a standard film gate 120. Lenses 104 and 106 are preferably identical lenses having optical paths 122 and 124, respectively. Optical paths 122 and 124 define the "points of origin" of lenses 104 and 106. Both optical paths 122 and 124 are preferably positioned in the same vertical plane thereby rendering optical paths 122 and 124 horizontally coincident with one another. However, through the use of mirrors 116 and 118, optical paths 122 and 124 are vertically aligned with respect to one another at a separation distance 126 which is preferably less than 65 mm, and most preferably on the order of 10-15 mm. Optical path 122 continues through lens 104, past shutter 108, striking mirror 116, and thereby being reflected to mirror 118 where the path is made to be coincident with that of optical path 124 upon passing through shutter 112 and striking the film. Optical path 124, after passing through lens 106, encounters shutter 110, and glass plate 114 which may be utilized to compensate optical paths so that paths 122 and 124 are optically identical.

Shutters 108 and 110 are synchronized out of phase with each other and are operated at a rate to result between 4 and 30 changes between optical path 122 and 124 per second. Shutter 112 and film gate 120 are standard and preferably operate at the standard frequency of 24 frames per second. Naturally, to achieve a rate of change greater than 24 changes per second and less than 30 changes per second, the speed of shutter 112 and film gate 120 must be increased beyond 24 frames per second. However, as mentioned before, the optimum range of operation is between 6 and 15 changes per second, and most preferably eight changes per second; rates easily obtained through a standard 24 frame per second shutter and film gate operation, using film strips having image orientations as illustrated in FIGS. 10c through 10e.

Shutters 108 and 110 may be operated by internally generated camera synchronization pulses. A pulse which triggers shutter 108 open typically would be utilized to close shutter 110. Moreover, a pulse which closes shutter 108 would be utilized to open shutter 110. Film plane shutter 112 opens only when either shutters 108 or 110 are open.

Lens 104 may be moved vertically with respect to lens 106 for greater or less parallax. Similarly, vertical motion of mirror 116 can be used to obtain proper alignment of images. With a reflex viewfinder and special switch to operate shutters 108 and 110 simultaneously, images from both points of origin may be brought into desired alignment before any film is exposed.

The teachings of the subject invention are also applicable to still photography. More specifically, a still display of an image using standard slides and standard projectors, in accordance with the principles of the present invention, will result in an effective three-dimensional illusion. For example, slides may be made with a single camera from two points of origin, vertically displaced from one another, and preferably vertically aligned with one another, and positioned a distance less than 65 mm, and preferably on the order to 10 to 15 mm, by moving the camera slightly between frames. The camera motion is perpendicular to the line from the camera to the subject being photographed.

Two useful techniques for making matched pairs of slides include mounting the camera on a screw driven rack attached to a tripod or other stable platform, or merely using a slot with a camera bolted through the slot. Transverse motion of the camera can be obtained along the length of the slot and the position can be measured with a set of calibration marks.

Stereoscopic effect is achieved by using two matched projectors and showing the two slides alternately, having the change from one slide to the other at a rate within the range of 4 to 30 changes per second. In order for the brain to recognize the two images as one, the images need to be overlapped with part of the scene of each slide in good registration with the comparable scene in the other slide. The two projectors may be positioned horizontally as shown in FIG. 12 by projectors 200 and 202, or vertically one above the other as shown in FIG. 13 by projectors 204 and 206. Better registration and control is achieved by stacking the projectors vertically as shown in FIG. 13.

The alternating images may be obtained by simply connecting the lamps 214 and 216 of projectors 204 and 206, respectively, to a switch 218 which powers one lamp 214, 216 while turning the other lamp off. Thus, as one lamp 214, for example, is shut off and the illumination of that lamp terminated, the other lamp 216 is activated, causing illumination for projector 206. The fade-out of lamps 214 and 216 as they are shut off, and the start-up of lamps 214 and 216 as they are turned on, facilitates the merger of the two images of the slides in projectors 204 and 206, thereby resulting in an effective and comfortable three-dimensional illusion. Switch 218 may be operated to result in a change of eight frames per second, but effective stereoscopic illusion can be achieved at a lower rate on the order of four frames per second, as well as at a higher rate on the order of 20 to 24 frames per second. As the rate approaches 30 frames per second, depth disappears from the image.

The techniques of the subject invention basically utilize the eye and brain's ability to perceive stereopsis through the merging of two or more separate images in a manner which may be referred as cyclopean perception. The key requirement is the need to give the brain two separate images. Conventionally the two images are received simultaneously through separate parallel inputs—the two eyes—and mixed in the brain. However, the subject invention presents the two images sequentially and the brain mixes the images using a short term memory storage capacity inherent within the brain. Since both eyes receive the same input, no specific glasses are required. In fact, closing one eye makes no change in the perceived depth. The image can be seen by people with only one eye and can also be seen, transmitted, and recorded with single-camera television systems. If the camera zooms in to a reduced portion of the image, and then pans across the scene, a very strong illusion of real movement is created. Similarly, zooming in to a small portion of the image does not change the effect and the apparent motion into the scene is enhanced.

One of the basic critical ingredients to achieving stereoscopic effect is timing the presentation of the images to the eyes sufficently fast so that the brain does not consciously perceive two separate images, but sufficiently slow so that the subconscious perception of two images is achieved. The ideal and critical range is between approximately four images per second and 30 images per second, with the preferred range between 6 and 15 images per second, and ideally on the order of about 8 changes per second. Moreover, registration difficulties are minimized by vertical orientation of the point of origin of the two images, and by reducing the distance between the points of origin to less than normal interocular distance, preferably on the order of 10 to 15 mm.

While particular embodiments of the present invention have been shown and discribed, it will of course be obvious to one skilled in the art that certain advantages and modifications can be effected without the departing from the spirit of the invention, such as the utilization of more than two cameras to create a stereoscopic effect. Accordingly, it is intended that the scope of the invention not be determined by the foregoing examples, but only by the scope of the appended claims.

We claim:

1. A method for producing a three-dimensional illusion of a subject comprising the step of sequentially displaying on a viewing surface images of the subject as viewed alternately first from one point of origin and then, time displaced, from another point of origin at a rate within a range of 4 to 30 changes between said points of origin per second, said points of origin being vertically displaced from one another.

2. The method of claim 1 wherein said rate is between 6 and 15 changes per second.

3. The method of claim 1 wherein said rate is about 8 changes per second.

4. The method of claim 1 wherein said points of origin are vertically aligned with respect to one another.

5. A method for producing a three-dimensional illusion of a subject comprising the step of sequentially displaying on a viewing surface, from a single point of projection, images of the subject as viewed alternately first from one point of origin and then, time displaced, from another point of origin at a rate within a range of 4 to 30 changes between points of origin per second, with said points of origin vertically displaced with respect to one another and with said points of origin displaced from one another a distance less than 65 millimeters.

6. The method of claim 5 wherein said rate is between 6 and 15 changes per second.

7. The method of claim 5 wherein said rate is about 8 changes per second.

8. The method of claim 5 wherein said distance is about 10 to 15 millimeters.

9. The method of claim 5, 6, 7, or 8 including the step of recording said images on a single photographic film, with said images from said one point of origin interposed between said images from said another point of origin; and wherein said images are displayed at a rate of 24 images per second.

10. The method of claim 5, 6, 7, or 8 including the step of obtaining said images by use of a video camera.

11. The method of claim 10 wherein said images are obtained by two separate cameras.

12. The method of claim 5, 6, 7, or 8 wherein said images are obtained by calculation of a computer.

13. The method of claim 5, 6, 7, or 8 wherein said points of origin are vertically aligned with respect to one another.

14. A method for producing a three-dimensional illusion of a subject comprising the steps of:
 a. obtaining first and second slides of said subject, said first slide representing a view of said subject from one point of origin and said second slide representing a view of said subject from another point of origin, said points of origin being vertically displaced from one another; and
 b. alternately displaying said slides at a rate within a range of 4 to 30 changes per second between said first and second slides.

15. The method of claim 14 wherein said rate is between 6 and 15 changes per second.

16. The method of claim 14 wherein said rate is about 8 changes per second.

17. The method of claim 14, 15, or 16 wherein said first slide is displayed from a first projector, and said second slide is displayed from a second projector.

18. The method of claim 17 wherein said step of displaying is achieved by alternately activating light sources of said first and second projectors.

19. The method of claim 14, 15, or 16 wherein points of origin are vertically aligned with respect to one another.

20. The method of claim 1, 2, 3, 4, 5, 6, 7, 8, 14, 15 or 16 wherein said subject is viewed for an equal length of time first from said one point of origin and then, time displaced, from said other point of origin.

* * * * *